(12) United States Patent
Messina et al.

(10) Patent No.: US 12,054,273 B2
(45) Date of Patent: Aug. 6, 2024

(54) AIRCRAFT COMPRISING AN ENGINE PYLON WITH A MOVABLE COVER ASSEMBLY AND A SPECIFIC LOCKING SYSTEM

(71) Applicant: Airbus Operations SAS, Toulouse (FR)

(72) Inventors: Paolo Messina, Toulouse (FR); Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 62 days.

(21) Appl. No.: 18/073,049

(22) Filed: Dec. 1, 2022

(65) Prior Publication Data

US 2023/0202665 A1 Jun. 29, 2023

(30) Foreign Application Priority Data

Dec. 6, 2021 (FR) ...................................... 2113019

(51) Int. Cl.
*B64D 29/06* (2006.01)
*B64D 27/40* (2024.01)

(52) U.S. Cl.
CPC ............. *B64D 29/06* (2013.01); *B64D 27/40* (2024.01)

(58) Field of Classification Search
CPC ............................. B64D 27/402; B64D 29/06
See application file for complete search history.

(56) References Cited

U.S. PATENT DOCUMENTS

| | | | |
|---|---|---|---|
| 4,428,609 A * | 1/1984 | Baehr | B64D 29/06 292/251 |
| 4,524,485 A | 6/1985 | Harris | |
| 4,538,843 A * | 9/1985 | Harris | E05C 19/145 292/DIG. 31 |
| 8,662,440 B2 * | 3/2014 | Journade | A61P 29/00 248/556 |
| 9,604,727 B2 * | 3/2017 | Delbosc | B64C 7/02 |
| 9,725,183 B2 * | 8/2017 | Aten | B64D 29/02 |
| 9,873,504 B2 * | 1/2018 | Aten | B64C 7/02 |

(Continued)

FOREIGN PATENT DOCUMENTS

| | | |
|---|---|---|
| EP | 0126840 A1 | 12/1984 |
| EP | 3656676 A1 | 5/2020 |
| FR | 3079216 A1 | 9/2019 |

OTHER PUBLICATIONS

French Search Report dated Jun. 22, 2022; priority document.

*Primary Examiner* — Philip J Bonzell
*Assistant Examiner* — Michael B. Kreiner
(74) *Attorney, Agent, or Firm* — Greer, Burns & Crain, Ltd.

(57) ABSTRACT

An aircraft comprising a fastening element and an engine pylon with two rear covers. Each cover includes a movable lower cover mounted articulated on a rear portion in which in the closed position, the two movable lower covers are moved together and in which in the open position, they are tilted and moved apart from each other. For each movable lower cover, a hinge system, and at least one locking system locks the two movable lower covers together in the closed position and locks each movable lower cover to the fastening element in the open position. The presence of the movable lower covers provides, inter alia, easy access to the inside of the engine pylon, and the locking system locks the movable lower covers.

8 Claims, 6 Drawing Sheets

(56) References Cited

U.S. PATENT DOCUMENTS

| | | | |
|---|---|---|---|
| 11,142,327 B2* | 10/2021 | Labarthe | B64D 29/02 |
| 11,319,083 B2* | 5/2022 | Geliot | B64D 33/02 |
| 11,370,543 B2* | 6/2022 | Herzig | B64D 1/02 |
| 11,679,888 B2* | 6/2023 | West | B64D 27/40 |
| | | | 244/54 |
| 11,753,176 B2* | 9/2023 | Courpet | B64D 29/06 |
| | | | 244/54 |
| 11,780,599 B2* | 10/2023 | Pautis | B64D 27/40 |
| | | | 244/54 |
| 2020/0070992 A1* | 3/2020 | Theron | B64F 5/40 |
| 2020/0164994 A1 | 5/2020 | Geliot et al. | |

\* cited by examiner

AIRCRAFT COMPRISING AN ENGINE PYLON WITH A MOVABLE COVER ASSEMBLY AND A SPECIFIC LOCKING SYSTEM

CROSS-REFERENCES TO RELATED APPLICATIONS

This application claims the benefit of the French patent application No. 2113019 filed on Dec. 6, 2021, the entire disclosures of which are incorporated herein by way of reference.

FIELD OF THE INVENTION

The present invention relates to an aircraft comprising an engine pylon with a movable aerodynamic cover assembly allowing access to the inside of the engine pylon and having a specific locking system.

BACKGROUND OF THE INVENTION

An aircraft conventionally comprises an engine, for example a turbojet engine, fastened under a wing of the aircraft using an engine pylon. The engine pylon consists of a rigid structure that is fastened both to a structure of the wing and to a structure of the engine. The engine pylon makes it possible to transfer the forces generated by the engine to the structure of the wing when the engine is running. The engine pylon also makes it possible for systems to pass between the wing and the engine, such as for example the electrical, hydraulic and pneumatic systems, etc.

In order to limit the drag of the engine pylon, it is covered by an aerodynamic fairing consisting of a cover assembly. The covers are positioned side by side in order to produce as smooth a surface as possible, and are fastened either to the structure of the engine pylon or to the structure of the wing of the aircraft.

In order to access the inside of the engine pylon, removable hatches are provided in some of these covers. The hatches are fastened using threaded elements or rivets and, after removal, a technician can access the inside of the engine pylon and thus perform maintenance operations on the elements present.

The fastening of the covers requires the presence of a relatively rigid, and therefore heavy, support structure. In addition, due to the manufacturing and assembly tolerances, multiple covers cannot be juxtaposed side by side without gaps and unevenness appearing between the covers. These gaps and unevenness can result in disturbance of the flow of air and the occurrence of acoustic phenomena. Finally, removing the hatches does not allow easy access to the inside of the engine pylon and their presence requires the installation of local structural reinforcing elements.

SUMMARY OF THE INVENTION

The present invention thus aims to propose an aircraft comprising an engine pylon comprising a movable cover assembly forming an aerodynamic skin of a secondary structure of the engine pylon. Such a movable cover assembly makes it possible to open the engine pylon for easy access to the rear zone of the engine pylon and the systems contained therein, in particular for maintenance and inspection tasks, and to the structure supporting the movable cover assembly, which is simplified compared to a structure of the prior art. In addition, this movable cover assembly can be made from a reduced number of two covers, distributed on either side of a vertical plane passing through the longitudinal axis of the engine, in order to reduce the disturbance of the flow of air and the occurrence of acoustic phenomena. In addition, such a movable cover assembly is provided with a specific locking system that makes it possible to fasten the movable covers in the open position.

To this end, an aircraft is proposed comprising a fastening element and an engine pylon comprising:
- a support structure comprising a front portion and a rear portion and suitable for fastening together an engine and a wing of the aircraft,
- a front secondary structure formed by a front cover assembly, in which the front secondary structure is fastened around the front portion of the support structure of the engine pylon,
- a rear secondary structure formed by an assembly of two rear covers that are positioned around the rear portion of the support structure of the engine pylon, in which each rear cover is in the form of a triangle an upper edge of which is suitable for running along the wing, a lower edge of which follows the lower portion of the rear portion and a front edge of which connects the other two edges to the front of the rear portion, in which each rear cover comprises a fixed upper cover rigidly connected to the rear portion and a movable lower cover mounted articulated on the rear portion between an open position and a closed position, in which the fixed upper cover and the movable lower cover are separated by a separating line generally parallel to the upper edge, in which in the closed position, the two movable lower covers are moved together and towards the rear portion so that the lower edges of the two movable lower covers are contiguous, and in which in the open position, the two movable lower covers are tilted so that the lower edges of the two movable lower covers are moved apart from each other,
- for each movable lower cover, a hinge system fastened between the movable lower cover and the rear portion, and
- at least one locking system that locks the two movable lower covers together in the closed position and that locks each movable lower cover to the fastening element in the open position.

The presence of the movable lower covers provides, inter alia, easy access to the inside of the engine pylon, and the specific locking system makes it possible to lock the movable covers in the open and closed positions.

Advantageously, for the at least one locking system, each movable lower cover comprises a boss through which passes a counterbored hole having a counterbore and which is rigidly connected to the movable lower cover, for each counterbored hole, there is a plug having a central bore and shutting off the counterbored hole at the opposite end to the counterbore, for each boss, the rear portion has a cavity for receiving the boss in the closed position, and for each counterbored hole, the fastening element has a tapped hole, and the locking system comprises a connecting pin comprising:
- a first pin mounted through the counterbored hole of one boss and comprising a first end forming a threaded stem and a second end with a first head having a first recess allowing the first pin to be screwed and unscrewed with a suitable tool, and
- a second pin mounted through the counterbored hole of the other boss and comprising a first end forming a tapped bore into which the threaded stem of the first pin is screwed and a second end with a second head having a first recess allowing the second pin to be screwed and unscrewed with a suitable tool, in which each pin comprises a shoulder accommodated between the corresponding plug and counterbore, and in which each head passes through the associated central bore and has a thread on its periphery that, in the open position, is screwed into a tapped hole of the fastening element provided to this end.

Advantageously, each pin has in its first end a second recess allowing the pin to be screwed and unscrewed with a suitable tool.

Advantageously, each recess is a hexagon socket recess.

Advantageously, each pin is provided with a lock nut that, in the closed position, is screwed onto the head of the pin and tightened against the corresponding plug.

Advantageously, the articulation of each movable lower cover is a rotation about an axis of rotation, which is generally parallel to the separating line and in the vicinity of the separating line.

Advantageously, each hinge system comprises at least two fixed brackets rigidly connected to the rear portion and, for each fixed bracket, a movable gooseneck fitting rigidly connected to the movable lower cover.

Advantageously, the locking system comprises, for each movable lower cover, a boss rigidly connected to the movable lower cover and a cavity made in the rear portion and capable of receiving the boss in the closed position, and the locking system comprises a connecting pin that is fastened through a bore made in each boss to this end.

Advantageously, each movable lower cover consists of a single component.

BRIEF DESCRIPTION OF THE DRAWINGS

The aforementioned features of the invention, along with others, will become more apparent on reading the following description of an embodiment, the description being given with reference to the appended drawings, in which.

DETAILED DESCRIPTION OF THE PREFERRED EMBODIMENTS

Figure 1:
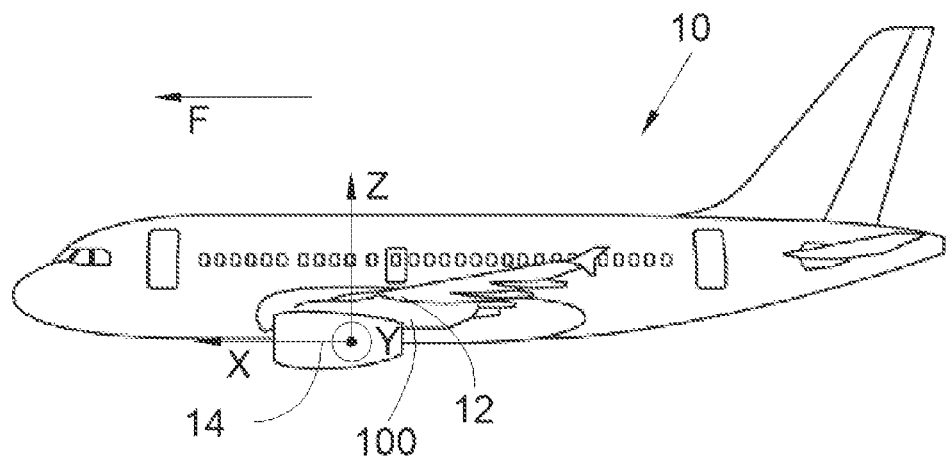
FIG. 1 is a side view of an aircraft according to the invention.

FIG. 1 shows an aircraft 10 comprising an engine 14, for example a turbojet engine, and a wing 12 under which the engine 14 is fastened by means of an engine pylon 100 according to the invention.

In the following description, terms relating to a position are given with reference to an aircraft 10 in the normal flight position, that is, as shown in FIG. 1, and the positions "front" and "rear" are given relative to the front and rear of the engine 14 and relative to the direction of travel F of the aircraft 10 when the engine 14 is operating.

In the following description, as is conventional, the longitudinal direction of the engine 14, which is parallel to the longitudinal axis of the engine, is referred to as X, the transverse direction, which is horizontal when the aircraft 10 is on the ground, is referred to as Y, and the vertical direction, which is vertical when the aircraft 10 is on the ground, is referred to as Z, these three directions X, Y and Z being orthogonal to each other.

Figure 2:
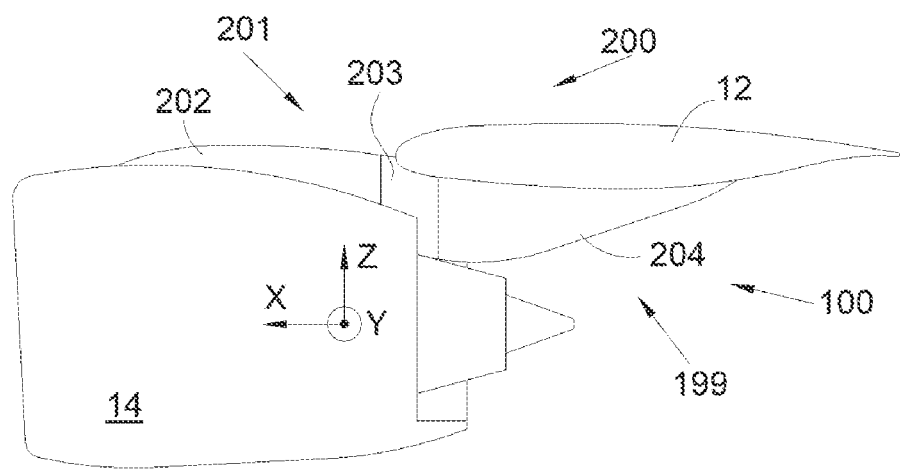
FIG. 2 is a side view of a powerplant comprising an engine pylon according to the invention.

FIG. 2 shows the wing 12 and the engine 14 fastened together by means of the engine pylon 100, which comprises a secondary structure 200, also known as an aerodynamic fairing, comprising a front secondary structure 201, also known as the front aerodynamic fairing, made up of an assembly of front covers 202, 203, and a rear secondary structure 199, also known as the rear aerodynamic fairing, made up of two rear covers 204.

In the embodiment of the invention shown here, the front cover assembly comprises a front cover 202 and an intermediate cover 203 positioned behind the front cover 202, but in another embodiment, the front cover 202 and the intermediate cover 203 can form a single cover.

The rear covers 204 are positioned behind the front cover assembly 202, 203, continuing in the longitudinal direction of the engine 14.

Here, the rear covers 204 are positioned under the wing 12 and behind the engine 14 and the front cover 202 is positioned above the engine 14 and in front of the wing 12. The intermediate cover 203 forms the joint between the front cover 202 and the rear cover 204. There is one intermediate cover 203, one front cover 202 and one rear cover 204 on each side of the engine pylon 100.

Figure 3:
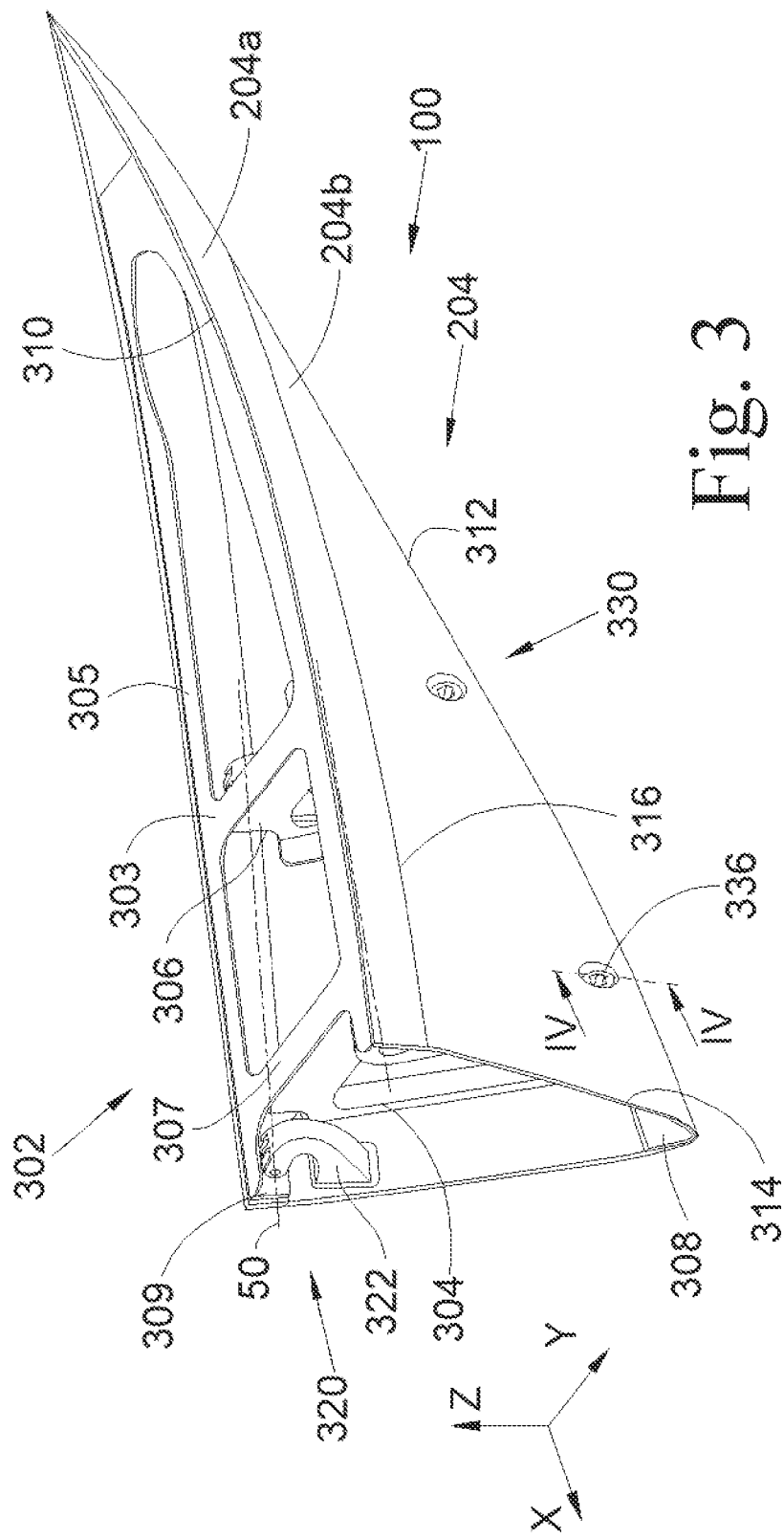
FIG. 3 is a perspective view of a rear secondary structure of the engine pylon according to the invention with the movable covers shown in the closed position.
Figure 5:
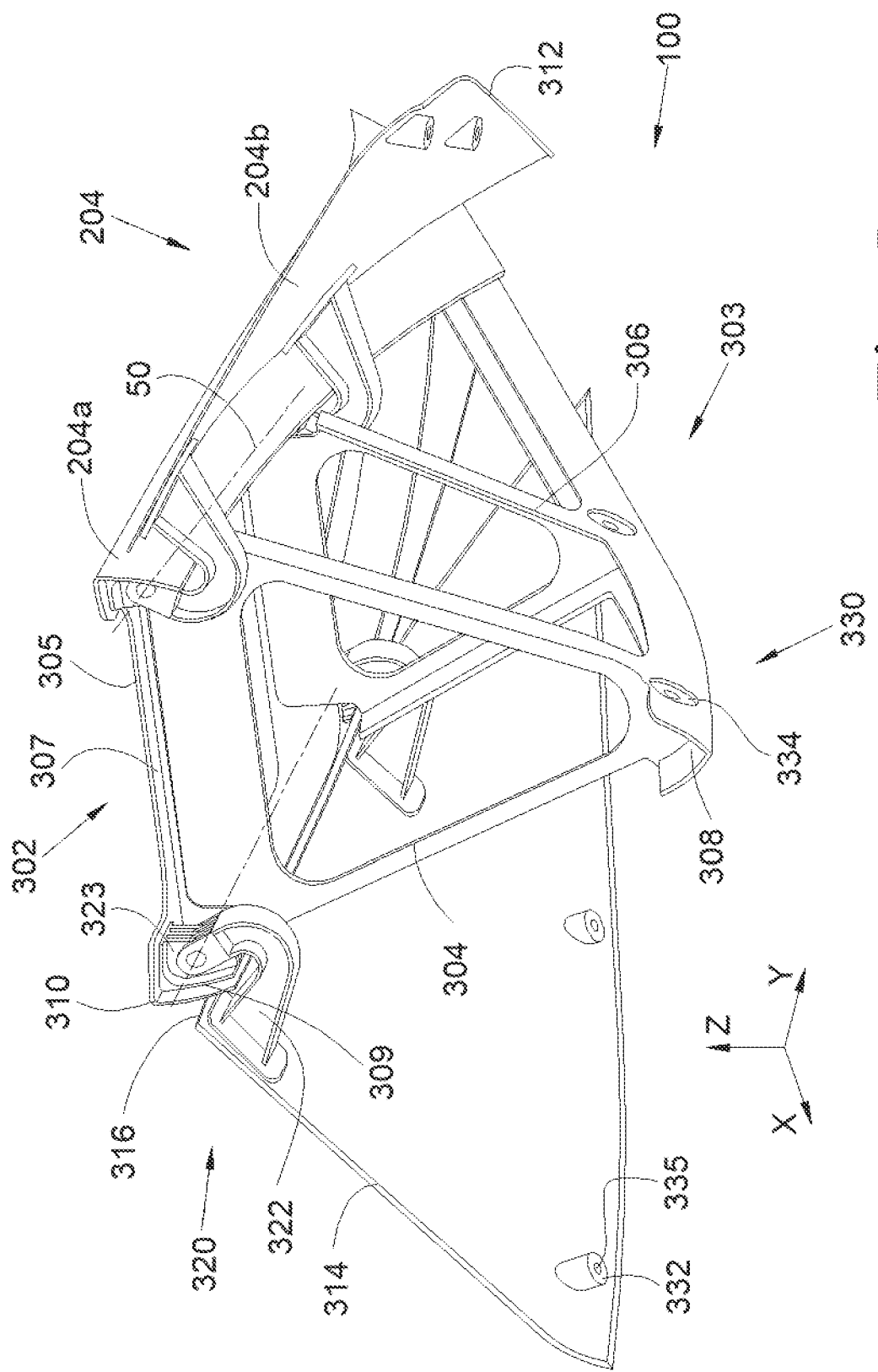
FIG. 5 is a perspective view of the rear secondary structure of the engine pylon according to the invention with the movable covers shown in the open position.

FIG. 3 shows the rear secondary structure 199 of the engine pylon 100 in the closed position of the rear covers 204, and FIG. 5 shows the rear secondary structure 199 of the engine pylon 100 in the open position of the rear covers 204. The two rear covers 204 do not have to be open simultaneously.

The engine pylon 100 comprises a rigid structure, also known as the primary structure, suitable for fastening together a structure of the engine 14 and a structure of the wing 12.

Figure 4:
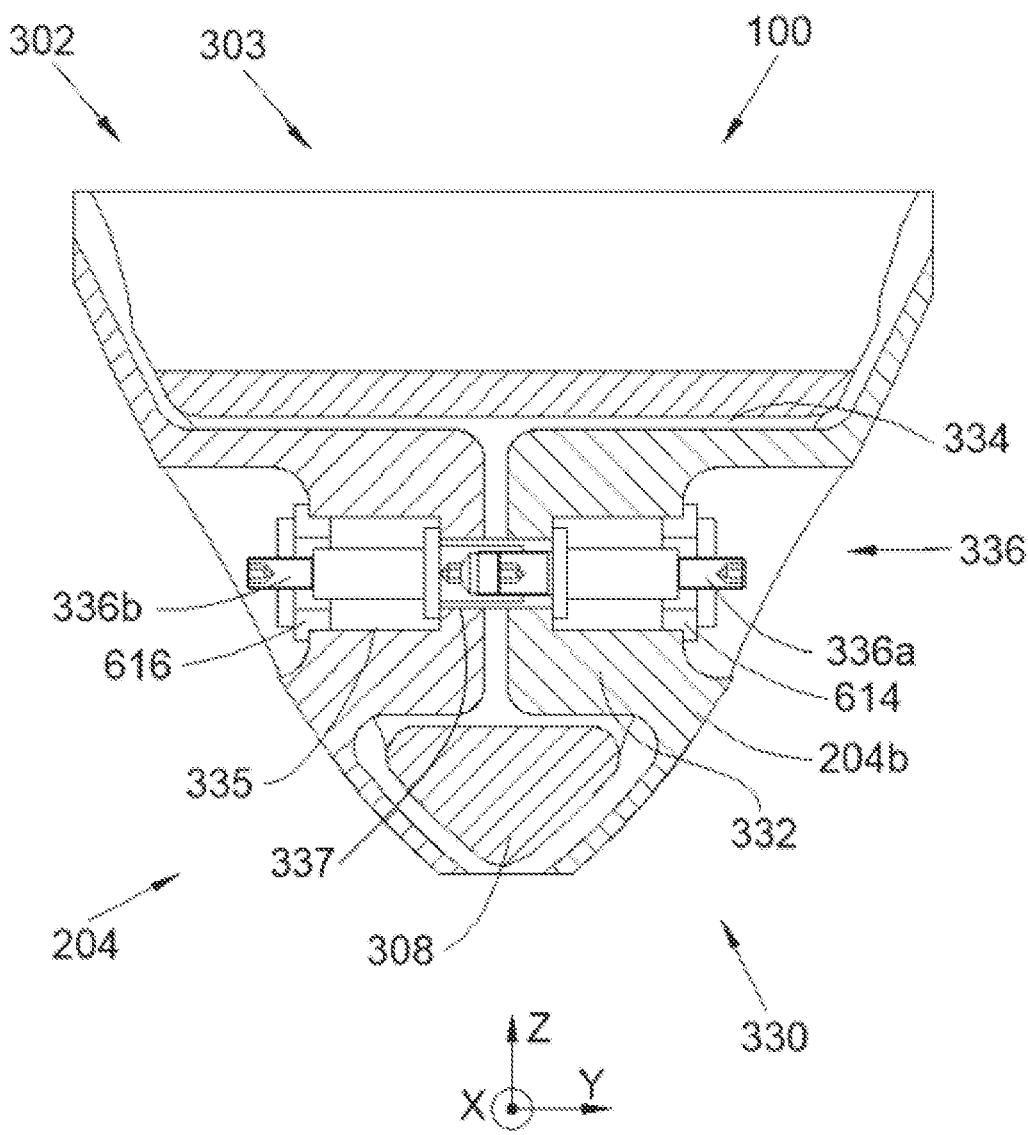
FIG. 4 is a cross-sectional view along the line IV-IV in FIG. 3, level with a locking system of the movable covers.

In addition, the engine pylon 100 comprises a support structure 302 acting as a support for the secondary structure 200. The support structure 302 comprises a front portion (not shown) and a rear portion 303 visible in FIGS. 3 to 5.

The front secondary structure 201, that is, the front cover assembly comprising the intermediate covers 203 and the front covers 202, is fastened around the front portion of the support structure 302.

The rear covers 204 are fastened around the rear portion 303 of the support structure 302, which in turn is fastened to the structure of the wing 12 using any appropriate means known to a person skilled in the art.

The rear portion 303 is in the general form of a triangular prism the two triangular bases of which are in planes perpendicular to the longitudinal direction X, an upper triangular face of which is oriented upwards and is positioned facing the wing 12 in order to be fastened thereto, and the other two faces of which are positioned to port and to starboard and come together downwards.

The upper triangular face of the prism forms an upper spar 305 the upper face of which is suitable for being joined to the wing 12.

In the embodiment of the invention shown in FIGS. 3 and 5, the upper spar 305 has turned-over edges 309 extending downwards on its lateral peripheries, together with transverse stiffeners 307 extending in the transverse direction Y.

Here, each triangular base forms a rib 304, 306, but there can be more ribs positioned one behind another parallel to the longitudinal direction X depending on the desired stiffness and the longitudinal extent of the rear portion 303. Each rib 304, 306 is thus in the form of a triangle a lower point of which is oriented downwards and a base of which is oriented upwards, that is, towards the wing 12. Here, each transverse stiffener 307 is positioned in line with a rib 304, 306 and the base of the rib 304, 306 is suitable for being joined to the transverse stiffener of the upper spar 305.

The frame also comprises a stem fitting 308, which is in the general form of a column, extending along the lower edge of the triangular prism, that is of the lower point of each rib 304, 306 here. The stem fitting 308 is rigidly connected to the lower point of each rib 304, 306 and extends generally parallel to the longitudinal direction X.

Towards the rear of the engine pylon 100, the stem fitting 308 rises towards the wing 12.

Each rear cover 204 is in the form of a triangle an upper edge 310 of which runs along the wing 12, a lower edge 312 of which follows the stem fitting 308, that is, the lower portion of the rear portion 303, and a front edge 314 of which connects the other two edges 310 and 312 to the front of the rear portion 303.

Each rear cover 204 comprises a fixed upper cover 204a and a movable lower cover 204b separated by a separating line 316 that is generally parallel to the upper edge 310. Each rear cover 204 is thus divided by the separating line 316 into a fixed upper cover 204a that extends along the wing 12 between the separating line 316 and the upper edge 310, and a movable lower cover 204b that extends between the separating line 316 and the lower edge 312.

The fixed upper covers 204a are rigidly connected to the rear portion 303, and, more particularly here, to the turned-over edges 309 of the upper spar 305 of the rear portion 303.

Each movable lower cover 204b is mounted articulated on the rear portion 303, and more particularly here on the upper spar 305, between an open position (FIG. 5) and a closed position (FIG. 3) and the articulation is a rotation about an axis of rotation 50.

In the closed position, the two movable lower covers 204b are moved together and towards the rear portion 303 so that the lower edges 312 of the two movable lower covers 204b are contiguous and form the trailing edge of the engine pylon 100.

In the open position, the two movable lower covers 204b are tilted so that the lower edges 312 of the two movable lower covers 204b are moved apart from each other so as to open a gap allowing access to the inside of the engine pylon 100.

In order to move from the closed position to the open position, each movable lower cover 204b is raised towards the outside of the engine pylon 100.

To this end, for each movable lower cover 204b, the engine pylon 100 comprises a hinge system 320 fastened between the movable lower cover 204b and the rear portion 303 and providing the articulation between the movable lower cover 204b and the rear portion 303, and, more particularly here, between the upper spar 305 and the movable lower cover 204b. There are therefore two hinge systems 320, one per side.

Each hinge system 320 comprises at least two fixed brackets 323 rigidly connected to the upper spar 305, and more generally to the rear portion 303 and, for each fixed bracket 323, a movable gooseneck fitting 322 rigidly connected to the movable lower cover 204b and allowing a large clearance on rotation while remaining invisible from the outside.

In the embodiment of the invention shown in FIGS. 3 and 5, each movable fitting 322 is positioned facing a fixed bracket 323 to form a yoke system having a common alignment of bores in order to form the axis of rotation 50 of the hinge system 320.

The axis of rotation 50 is generally parallel to the separating line 316 and in the vicinity of the separating line 316.

The engine pylon 100 also comprises at least one locking system 330 which, when the two movable lower covers 204b are in the closed position, locks the two movable lower covers 204b together, and locks each movable lower cover 204b in the open position to a fastening element of the aircraft 10 such as, for example, part of the wing 12 in order to hold it in the open position.

Such an engine pylon 100 with movable lower covers 204b has a simple, light structure and easier access, and the locking system 330 holds the movable lower covers 204b in the open position and the closed position.

In the embodiment of the invention shown, there are two locking systems 330 distributed along the lower edges 312. Of course, a different number is possible depending on the length of the lower edge 312 to be locked. Likewise, when there are multiple locking systems 330, just one is sufficient for fastening to the fastening element (wing) 12 in the open position.

For each locking system 330, each movable lower cover 204b comprises a boss 332 rigidly connected to the movable lower cover 204b and for each boss 332, the rear portion 303, here the stem fitting 308, has a cavity 334 for receiving the boss 332 in the closed position and thus producing a centering system for positioning the movable lower cover 204b correctly in the closed position. For each boss 332 of a movable lower cover 204b, there is a boss 332 of the other movable lower cover 204b that faces it in the closed position.

The locking system 330 comprises a connecting pin 336 that is fastened through a counterbored hole 335 provided in each boss 332 to this end. Such a locking system 330 has the advantage of being concealed and does not therefore disturb the flow of air along the movable lower covers 204b.

Figure 6:
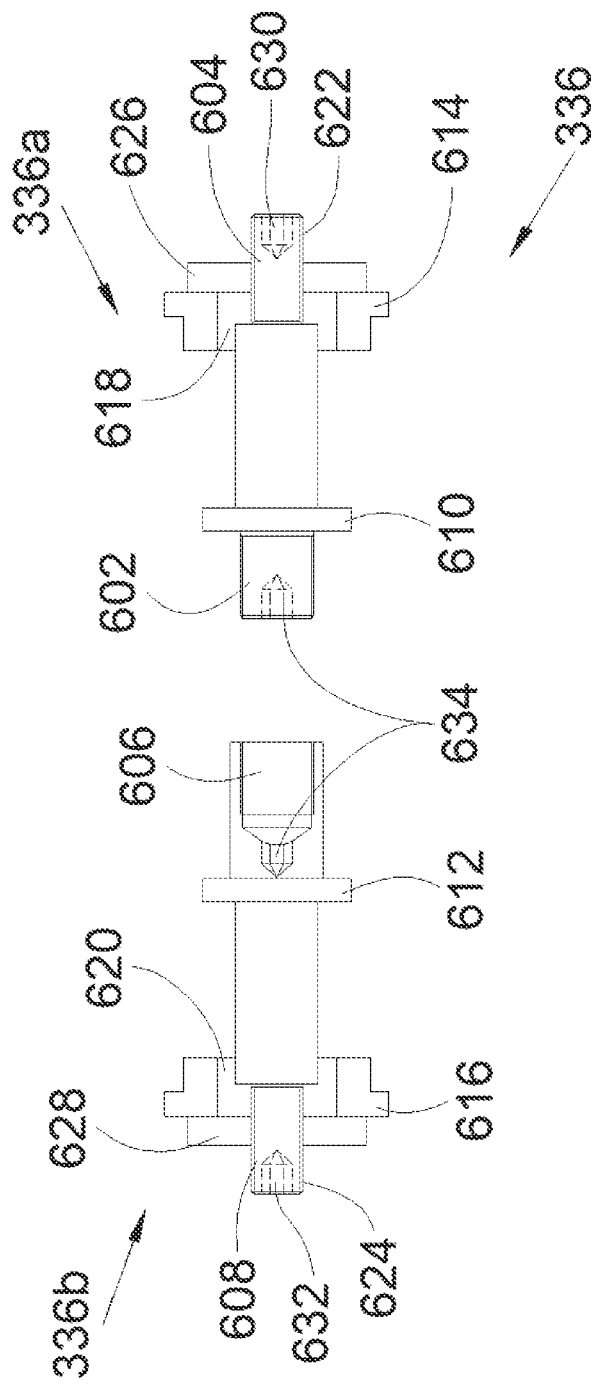
FIG. 6 is a view of a connecting pin implemented in the context of the invention.
Figure 7:
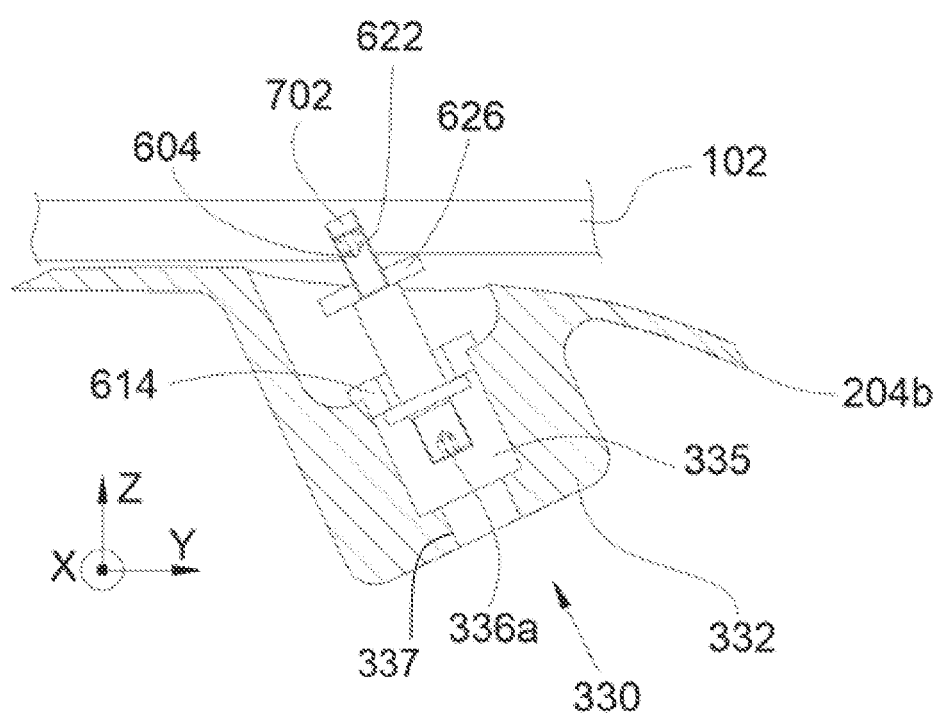
FIG. 7 is a view of a movable cover in the open position.

FIG. 6 shows the connecting pin 336 in the separated position and FIG. 7 shows one of the movable lower covers 204b in the open position.

The connecting pin 336 comprises a first pin 336a mounted through the counterbored hole 335 of one boss 332 and a second pin 336b mounted through the counterbored hole 335 of the other boss 332.

The first pin 336a comprises a first end forming a threaded stem 602 and a second end with a first head 604 having a first recess 630 allowing the first pin 336a to be screwed and unscrewed with a suitable tool. In the embodiment of the invention shown here, the first head 604 has a first hexagon socket recess 630.

The second pin 336b comprises a first end forming a tapped bore 606 into which the threaded stem 602 is screwed, and a second end with a second head 608 having a first recess 632 allowing the second pin 336b to be screwed and unscrewed with a suitable tool. In the embodiment of the invention shown here, the second head 608 has a first hexagon socket recess 632.

In the closed position, the two pins 336a-b are aligned and the threaded stem 602 is screwed into the tapped bore 606.

Each pin 336a-b comprises a shoulder 610, 612 around the pin 336a-b, having a diameter larger than the hole of the counterbore 337 and smaller than the diameter of the counterbored hole 335. The shoulder 610, 612 can be in the form of a ring, for example. Each shoulder 610, 612 rests against the counterbore 337 of the counterbored hole 335 in which the associated pin 336a-b is mounted when the two pins 336a-b are screwed in the closed position.

Each movable lower cover 204b comprises, in each counterbored hole 335, a plug 614, 616 that shuts off the counterbored hole 335 at the opposite end to the counterbore 337 and has a central bore 618, 620 through which the associated pin 336a-b, and, more particularly, the head 604, 608 thereof, can pass. Here, each plug 614, 616 is in the form of an externally-threaded nut that is screwed into the mouth of the counterbored hole 335. The central bore 618, 620 has a larger diameter than the pin 336a-b that passes through it and a smaller diameter than the shoulder 610, 612, in order to ensure that the shoulder 610, 612 remains translatably immobilized between the plug 614, 616 and the counterbore 337, thus preventing the loss of the pin 336a-b when the two pins 336a-b are not screwed together. Each shoulder 610, 612 is thus accommodated between the corresponding plug 614, 616 and counterbore 337.

The head 604, 608 is sized so that it passes through the corresponding central bore 618, 620 and it has a thread 622, 624 on its periphery that, in the open position, makes it possible to screw the head 604, 608 into a tapped hole 702 provided to this end in the fastening element 12 of the aircraft 10, and, more particularly for example, in the skin of the wing 12.

From the closed position with the two pins 336a-b screwed together, a technician thus unscrews them using the first recesses 630 and 632 provided to this end in the heads 604 and 608 of the two pins 336a-b. After unscrewing, the technician can tilt one or both of the movable lower covers 204b to the open position, and screw the head 604, 608 of each movable lower cover 204b in the open position into the tapped hole 702 provided to this end in the fastening element 12.

In order to facilitate the screwing and unscrewing of the head 604, 608, each pin 336a-b has in its first end a second recess 634 allowing the pin 336a-b to be screwed and unscrewed with a suitable tool. In the embodiment of the invention shown here, each second recess 634 is a hexagon socket recess.

The first pin 336a thus has a hexagon socket recess 634 in the first end holding the threaded stem 602 and the second pin 336b thus has a hexagon socket recess 634 at the bottom of the tapped bore 606.

In order to limit the risk of the pins 336a-b being unscrewed in the closed position, each pin 336a-b is provided with a lock nut 626, 628 that is screwed onto the head 604, 608 and tightened against the plug 614, 616. In order to unscrew the threaded stem 602 and the tapped bore 606, the technician will first unscrew the lock nuts 626, 628.

In one embodiment, in order to limit the disturbance of the aerodynamic flow, the two ends of the connecting pin 336 could be covered by a plug or a hardening paste such as sealant, for example.

Advantageously, each movable lower cover 204b consists of a single component made for example by molding, thus limiting the presence of joining zones capable of disturbing the flow of the air. Each rear cover 204 has a single separating line 316 that extends generally parallel to the air flow during flight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a fastening element, and
an engine pylon comprising:
  a support structure comprising a front portion and a rear portion and suitable for fastening together an engine and a wing of said aircraft,
  a front secondary structure formed by a front cover assembly, in which the front secondary structure is fastened around the front portion of the support structure of the engine pylon,
  a rear secondary structure formed by an assembly of two rear covers that are positioned around the rear portion of the support structure of the engine pylon,
wherein each rear cover is formed as a triangle, an upper edge of which is suitable for running along the wing, a lower edge of which follows a lower portion of the rear portion and a front edge of which connects the upper and lower edges to the front of the rear portion,
wherein each rear cover comprises a fixed upper cover rigidly connected to the rear portion and a movable lower cover mounted articulated on the rear portion between an open position and a closed position,
wherein the fixed upper cover and the movable lower cover are separated by a separating line generally parallel to the upper edge,
wherein in the closed position, the two movable lower covers are moved together and towards the rear portion so that the lower edges of the two movable lower covers are contiguous,
wherein in the open position, the two movable lower covers are tilted so that the lower edges of the two movable lower covers are moved apart from each other,
  for each movable lower cover, a hinge system fastened between the movable lower cover and the rear portion, and
  at least one locking system that locks the two movable lower covers together in the closed position and that locks each movable lower cover to the fastening element in the open position.

2. The aircraft according to claim 1,
wherein for said at least one locking system, each movable lower cover comprises a boss through which passes a counterbored hole having a counterbore and which is rigidly connected to said movable lower cover, for each counterbored hole, there is a plug having a central bore and shutting off the counterbored hole at an opposite end to the counterbore,
wherein for each boss, the rear portion has a cavity for receiving the boss in the closed position,
wherein for each counterbored hole, the fastening element has a tapped hole, and
wherein the locking system comprises a connecting pin comprising:

a first pin mounted through the counterbored hole of a first of the bosses and comprising a first end forming a threaded stem and a second end with a first head having a first recess allowing the first pin to be screwed and unscrewed with a suitable tool, and a second pin mounted through the counterbored hole of a second of the bosses and comprising a first end forming a tapped bore into which the threaded stem of said first pin is screwed and a second end with a second head having a first recess allowing the second pin to be screwed and unscrewed with a suitable tool, wherein each pin comprises a shoulder accommodated between the corresponding plug and counterbore, and wherein each head passes through the associated central bore and has a thread on its periphery that, in an open position, is screwed into a tapped hole of the fastening element provided to this end.

3. The aircraft according to claim 2, wherein each pin has in its first end a second recess allowing said pin to be screwed and unscrewed with a suitable tool.

4. The aircraft according to claim 2, wherein each recess is a hexagon socket recess.

5. The aircraft according to claim 2, wherein each pin is provided with a lock nut that, in the closed position, is screwed onto the head of said pin and tightened against the corresponding plug.

6. The aircraft according to claim 1, wherein an articulation of each movable lower cover is a rotation about an axis of rotation, which is generally parallel to the separating line and in a vicinity of the separating line.

7. The aircraft according to claim 1, wherein each hinge system comprises at least two fixed brackets rigidly connected to the rear portion and, for each fixed bracket, a movable gooseneck fitting rigidly connected to the movable lower cover.

8. The aircraft according to claim 1, wherein each movable lower cover consists of a single component.

* * * * *